US009141968B2

(12) United States Patent
Xu et al.

(10) Patent No.: US 9,141,968 B2
(45) Date of Patent: Sep. 22, 2015

(54) SYSTEM AND METHOD FOR REDEEMING AN ELECTRONIC PROMOTION CODE AT A POINT OF SALE

(75) Inventors: Lei Xu, Beijing (CN); Juqiang Bao, Beijing (CN); Wei Zhou, Beijing (CN); Wanhui Dai, Beijing (CN)

(73) Assignee: BEIJING BUDINGFANGZHOU TECHNOLOGY CO., LTD., Beijing (CN)

( * ) Notice: Subject to any disclaimer, the term of this patent is extended or adjusted under 35 U.S.C. 154(b) by 23 days.

(21) Appl. No.: 13/583,889

(22) PCT Filed: Apr. 24, 2012

(86) PCT No.: PCT/CN2012/074618
§ 371 (c)(1),
(2), (4) Date: Apr. 3, 2013

(87) PCT Pub. No.: WO2013/155727
PCT Pub. Date: Oct. 24, 2013

(65) Prior Publication Data
US 2013/0282462 A1   Oct. 24, 2013

(30) Foreign Application Priority Data

Apr. 19, 2012   (CN) .................. PCT/CN2012/074404

(51) Int. Cl.
*G06Q 30/00*   (2012.01)
*G06Q 30/02*   (2012.01)

(52) U.S. Cl.
CPC ........ *G06Q 30/0238* (2013.01); *G06Q 30/0251* (2013.01)

(58) Field of Classification Search
CPC .................................................. G06Q 30/0238
USPC ..................................................... 705/14.38
See application file for complete search history.

(56) References Cited

U.S. PATENT DOCUMENTS 6,002,771 A * 12/1999 Nielsen ........................ 705/76
6,239,748 B1 * 5/2001 Gilhousen ................. 342/442
(Continued)

FOREIGN PATENT DOCUMENTS

CN       1696965 A    11/2005
CN     101242271 A     8/2008

OTHER PUBLICATIONS

Beijing Budingfangzhou Technology Co. ISR/WO, PCT/CN2012/074618, Jan. 17, 2013, 13 pgs.

*Primary Examiner* — John G Weiss
*Assistant Examiner* — Scott C Anderson
(74) *Attorney, Agent, or Firm* — Morgan, Lewis & Bockius LLP

(57) ABSTRACT

An authentication device and a mobile device work together for redeeming an electronic promotion code at a point of sale. Upon receipt of an electronic promotion code, the authentication device encrypts the electronic promotion code and transmits the encrypted promotion code to the mobile device. In response, the mobile device decrypts the encrypted promotion code and determines whether the decrypted promotion code satisfies one or more predefined conditions. If so, the mobile device displays a message, indicating a successful redemption of the promotion code at the point of sale. In some implementations, the message includes a confirmation code, which is provided to the authentication device for generating a transaction log record. In some implementations, the mobile device also generates a separate transaction log record for the promotion code and transmits the transaction log record to a remote server for further processing.

10 Claims, 6 Drawing Sheets

(56) References Cited

U.S. PATENT DOCUMENTS

| | | |
|---|---|---|
| 7,877,288 B1 * | 1/2011 | Cunningham et al. ..... 705/14.26 |
| 2004/0029569 A1 * | 2/2004 | Khan et al. ................. 455/414.1 |
| 2008/0114650 A1 | 5/2008 | Ku |
| 2008/0201226 A1 * | 8/2008 | Carlson et al. .................. 705/14 |
| 2010/0036772 A1 | 2/2010 | Arceneaux |
| 2010/0082989 A1 * | 4/2010 | Bussard et al. ............... 713/176 |
| 2011/0082735 A1 * | 4/2011 | Kannan et al. ............. 705/14.23 |

* cited by examiner

US 9,141,968 B2

SYSTEM AND METHOD FOR REDEEMING AN ELECTRONIC PROMOTION CODE AT A POINT OF SALE

TECHNICAL FIELD

The disclosed implementations relate generally to a commercial transaction system involving mobile devices, and in particular, to system and method for redeeming an electronic promotion code at a point of sale (POS).

BACKGROUND

In order to win more customers' business, many companies may offer discounted products or services by distributing paper-based business promotion materials, e.g., coupons. A customer, who wants to receive such discounted products or services, is required to bring a coupon with him or her to a store and return the coupon to a store clerk. By collecting coupons from the redeeming customers, a company can evaluate the effectiveness of the marketing strategy. For example, based on the number of coupons released and the number of coupons redeemed, a company may decide to adjust its marketing strategy and investment and maximize its effect. But the requirement that a customer must have a paper coupon with him or her before receiving discounted products or services is less convenient or even cumbersome. Very often, a potential customer may walk by a store without paying a visit because he or she does not have the coupon in hand.

SUMMARY

In accordance with some implementations described below, a method performed by an authentication device for redeeming an electronic promotion code at a point of sale is provided. The authentication device has memory and one or more processors and it is configured to perform the following operations: receiving a user input of an electronic promotion code; encrypting the electronic promotion code; transmitting the encrypted promotion code to a mobile device at the point of sale, wherein the mobile device is held by a customer visiting the point of sale; and receiving a confirmation code, wherein the confirmation code is generated by the mobile device; and storing the confirmation code in a storage device.

In accordance with some implementations described below, an authentication device and a mobile device work in concert for redeeming an electronic promotion code at a point of sale. The authentication device is configured to perform the following operations: receiving a user input of an electronic promotion code; encrypting the electronic promotion code; and transmitting the encrypted promotion code to the mobile device. The mobile device is configured to perform the following operations: receiving the encrypted promotion code; decrypting the encrypted promotion code; and after determining that the decrypted promotion code satisfies one or more predefined conditions, displaying a message on the mobile device, indicating a successful redemption of the promotion code.

In accordance with some implementations described below, an authentication device for redeeming an electronic promotion code at a point of sale is provided. The authentication device includes: a microcontroller unit; a user input device; and memory for storing one or more programs. The programs, when executed by the microcontroller unit, cause the authentication device to: receive an electronic promotion code through the user input device; encrypt the electronic promotion code; transmit the encrypted promotion code to a mobile device at the point of sale, wherein the mobile device is held by a customer visiting the point of sale; receive a confirmation code, wherein the confirmation code is generated by the mobile device; and store the confirmation code in a storage device that is communicatively coupled to the authentication device.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

The wide spread of smart phones and mobile applications provides a potential new platform for distributing paperless business promotion materials. One aspect of the present application is directed to a system that requires minimum hardware and software deployment but supports easy and secure redemption of electronic coupons, each coupon having a promotion code or identifier. A customer can enjoy the discounted products or services by redeeming his or her electronic coupon at any point of sale that supports the system without having to carry any paper coupons.

Figure 1:
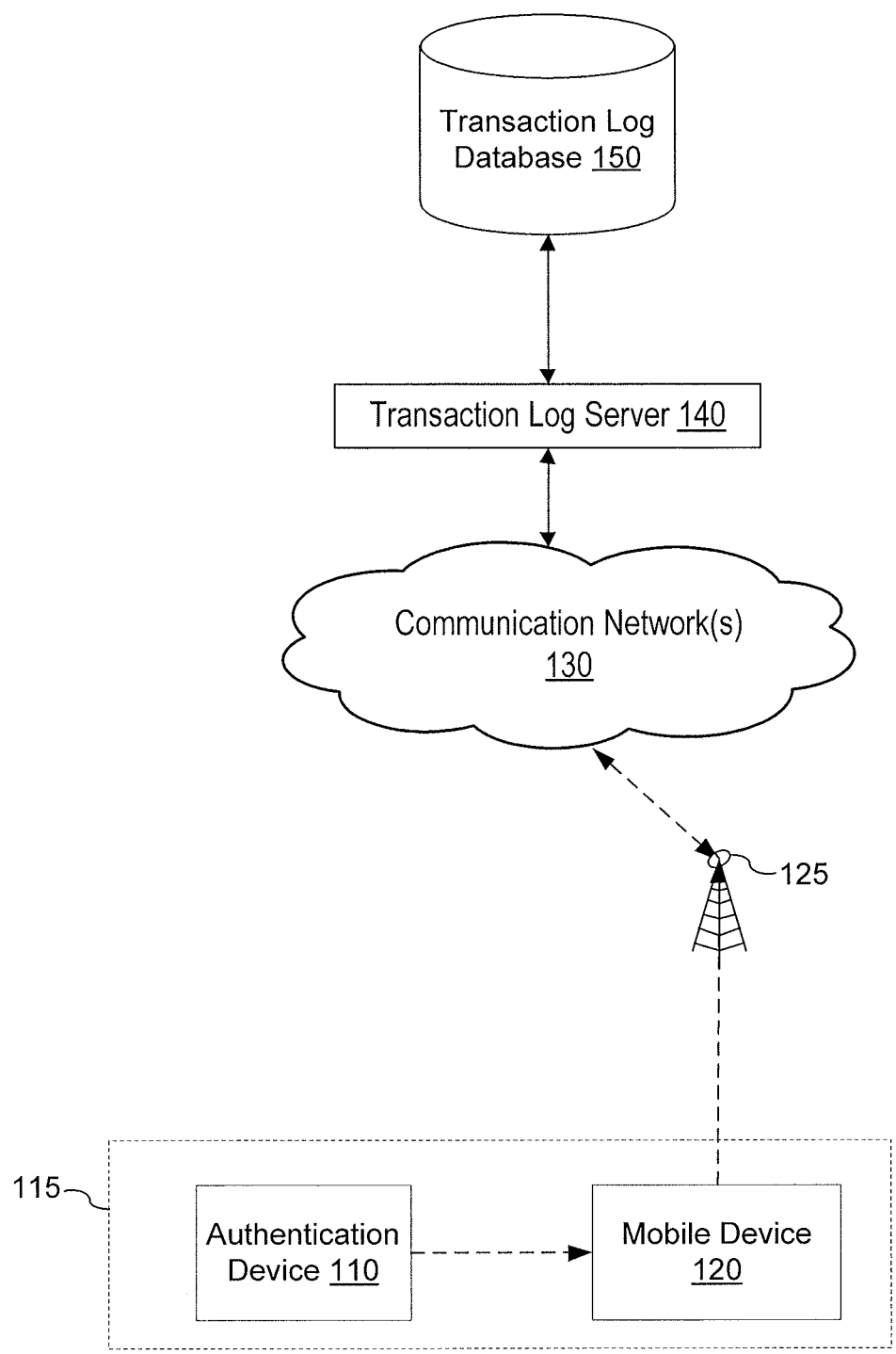
FIG. 1 is a block diagram illustrating a distributed network system including an authentication device, a mobile device, and a transaction log server in accordance with some implementations.

FIG. 1 is a block diagram illustrating a distributed network system including an authentication device 110, a mobile device 120, and a transaction log server 140 in accordance with some implementations. A user of the mobile device 120 visits a point of sale 115 (e.g., a restaurant) that has the authentication device 110. The user has an electronic coupon that can be redeemed at the point of sale 115. To do so, the user invokes a mobile application on the mobile device 120 to render the electronic coupon on the display of the mobile device. The electronic coupon typically includes a promotion code (e.g., a 1-D or 2-D bar code). In some implementations, the promotion code may be unique to the electronic coupon such that different coupons provided to different users have different promotion codes. In some other implementations, one promotion code may be shared by multiple electronic coupons. For example, electronic coupons provided to mobile devices within a particular geographical region may have the same promotion code.

The authentication device 110 is configured to communicate with the mobile device 120 to authenticate the promotion code displayed on the mobile device 120. In some implementations, the authentication includes confirming that the promotion code is authentic and it has not been redeemed before by this customer or another one. For a marketing agency that is responsible for distributing the electronic coupons in connection with a marketing campaign, it is valuable to learn not only how many of the authentic electronic coupons have been redeemed but also where and when they were redeemed and who redeemed them. As will be described below, the authentication device 110 and the mobile device 120 work in concert to prevent a non-authentic promotion code from being redeemed or one promotion code from being redeemed multiple times if this is not allowed by the authorizing entity.

In some implementations, the authentication device 110 has limited communication capability. As shown in FIG. 1, the authentication device 110 can only communicate with the mobile device 120 at the point of sale 115 via sound or radio signal on limited data for the purpose of authenticating a promotion code. This feature not only simplifies the design of the authentication device 110 but also reduces the cost of manufacturing the authentication device 110. The mobile device 120 has access the transaction log server 140 via the base station 125 and the communication networks 130 (e.g., the Internet). Note that this is the inherent capability of the mobile device 120, not anything additional for supporting the authentication of the promotion code.

In some implementations, the transaction log server 140 is coupled to a transaction log database 150 for storing the transaction log records provided by the authentication device 110 or the mobile device 120. After loading enough data from many points of sale into the database 150, the transaction log server 140 can perform various data-mining operations to the data set therein to identify the consumer responses to a particular product or service, which is a subject of a particular marketing campaign.

Figure 2A:
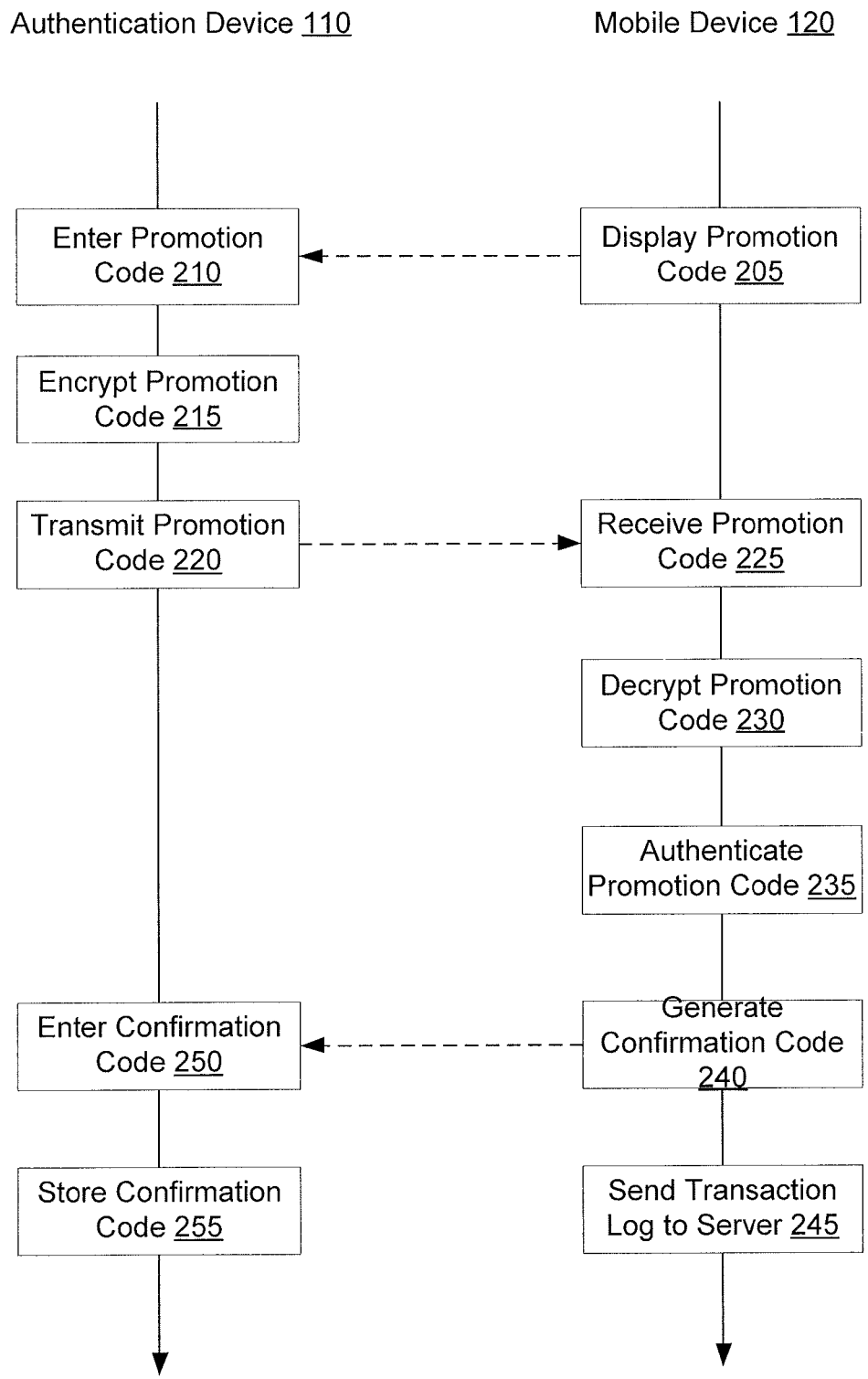
FIG. 2A depicts two flow charts illustrating how the authentication device and the mobile device interact with each other to redeem an electronic promotion code in accordance with some implementations.

FIG. 2A depicts two flow charts illustrating how the authentication device 110 and the mobile device 120 interact with each other to redeem an electronic promotion code in accordance with some implementations. When a customer redeems his or her electronic coupon at the point of sale 115 (e.g., a restaurant), the customer first starts a corresponding mobile application on the mobile device 120, which renders (205) a promotion code on the display of the mobile device 120. Note that the mobile device includes a mobile phone, a tablet computer, a laptop computer, and a netbook computer. A personnel (e.g., a clerk) working at the point of sale 115 then enters (210) the promotion code into the authentication device 110 using an input device (e.g., a keyboard) associated with the authentication device 110.

In some implementations, the authentication device 110 cannot determine the authenticity of the promotion code by itself. It needs to coordinate with the mobile device 120 to accomplish this goal. Note that many marketing campaigns offer additional incentives (e.g., gifts or bonuses) to actual participant customers. Thus, in order to prevent fraud activities by customers that do not actually redeem their promotion codes at a point of sale but still want to receive the gifts or bonuses, this authentication process cannot be done by the mobile device 120 without the participation of the authentication device 110. As shown in FIG. 2A, the authentication device 110 encrypts (215) the promotion code entered by the clerk and then transmits (220) the encrypted promotion code back to the mobile device 120. There are multiple ways for the authentication device 110 to transmit the promotion code. For example, the authentication device 110 may convert the encrypted promotion code into a high-frequency audio signal and broadcast the high-frequency audio signal to the mobile device via a speaker of the authentication device 110. For example, the authentication device 110 converts the promotion code into a high-frequency audio signal using one of the multiple frequency-shift keying (MFSK) algorithms such that the audio signal transmitted in the air is securely encrypted from being detected and decrypted by an unintended third-party decipher while providing a hint to the customer of the progress of authenticating the promotion code. In some other implementations, the authentication device 110 includes a radio-frequency transceiver with limited radio broadcasting capability (e.g., Wi-Fi or Bluetooth). Therefore, the authentication device 110 converts the encrypted promotion code into a radio-frequency signal and then broadcasts the radio-frequency signal to the mobile device via the radio-frequency transceiver.

After receiving (225) the encrypted promotion code (which is, e.g., in the form of a high-frequency audio signal), the mobile device 110, or more specifically, a mobile application running on the mobile device 110 is invoked to decrypt (230) the promotion code. In some implementations, the mobile application implements a digital signal processing module based on the Geortzel algorithm for converting the audio signal back to a decrypted digital sequence. In this case, the party that provides the authentication device 110 to the point of sale 115 is also the party that develops the mobile application for decrypting the promotion code. Therefore, the mobile application should be able to decrypt the promotion code correctly. But since the user of the mobile device 120 does not know how the promotion code is encrypted/decrypted, the user cannot "game" the mobile application by "redeeming" a promotion code that has not been redeemed. Next, the mobile application authenticates (235) the decrypted promotion code by comparing the decrypted promotion code with one or more predefined conditions. If the decrypted promotion code satisfies the predefined conditions, the mobile application determines that the promotion code has been authenticated and redeemed at the point of sale 115.

After authenticating the promotion code, the mobile application on the mobile device 120 displays a message on the mobile device, indicating a successful redemption of the promotion code. In some implementations, the mobile application generates (240) a confirmation code and includes the confirmation code in the message on the display of the mobile device 120. The mobile application may also generate a transaction log record for the redemption of the promotion code, with the confirmation code included in the log record, and then sends (245) the transaction log record to the transaction log server 140 via the connection path shown in FIG. 1. With the permission of the user of the mobile device 120, the transaction log record may also include a unique identifier (e.g., phone number or IP address) of the mobile device 120, a timestamp associated with this particular transaction, the current location of the mobile device 120, etc. These parameters are helpful for the transaction log server 140 to mine the data set stored in the database 150.

As part of the transaction protocol, the clerk at the point of sale 115 enters (250) the confirmation code into the authentication device 110. The authentication device 110 may have a built-in storage device or may be coupled to a detachable storage device (e.g., a USB-based flash drive). In response, the authentication device 110 may generate another transaction log record, including the promotion code, the confirmation code, a timestamp associated with this transaction, the location of the point of sale 115, etc, and store (255) the record in the storage device. Although the authentication device 110 cannot directly transmit this transaction log record to the transaction log server 140, it is saved at the point of sale 115 for any future use. For example, the party that operates the server 140 or the party that launches the marketing campaign may randomly visit a particular point of sale and make a copy of the transaction log records stored in the authentication device and compares them with the data record stored in the database 150 to detect discrepancies between the two data sets. This feature is important if the point of sale 115 is subsidized for providing the discounted products or services based on the number of promotion codes redeemed at the point of sale. In some implementations, the data record generated by authentication device 110 is encrypted so that the party that operates the point of sale cannot fake data cords in order to receive more subsidies it is not entitled to.

Figure 2B:
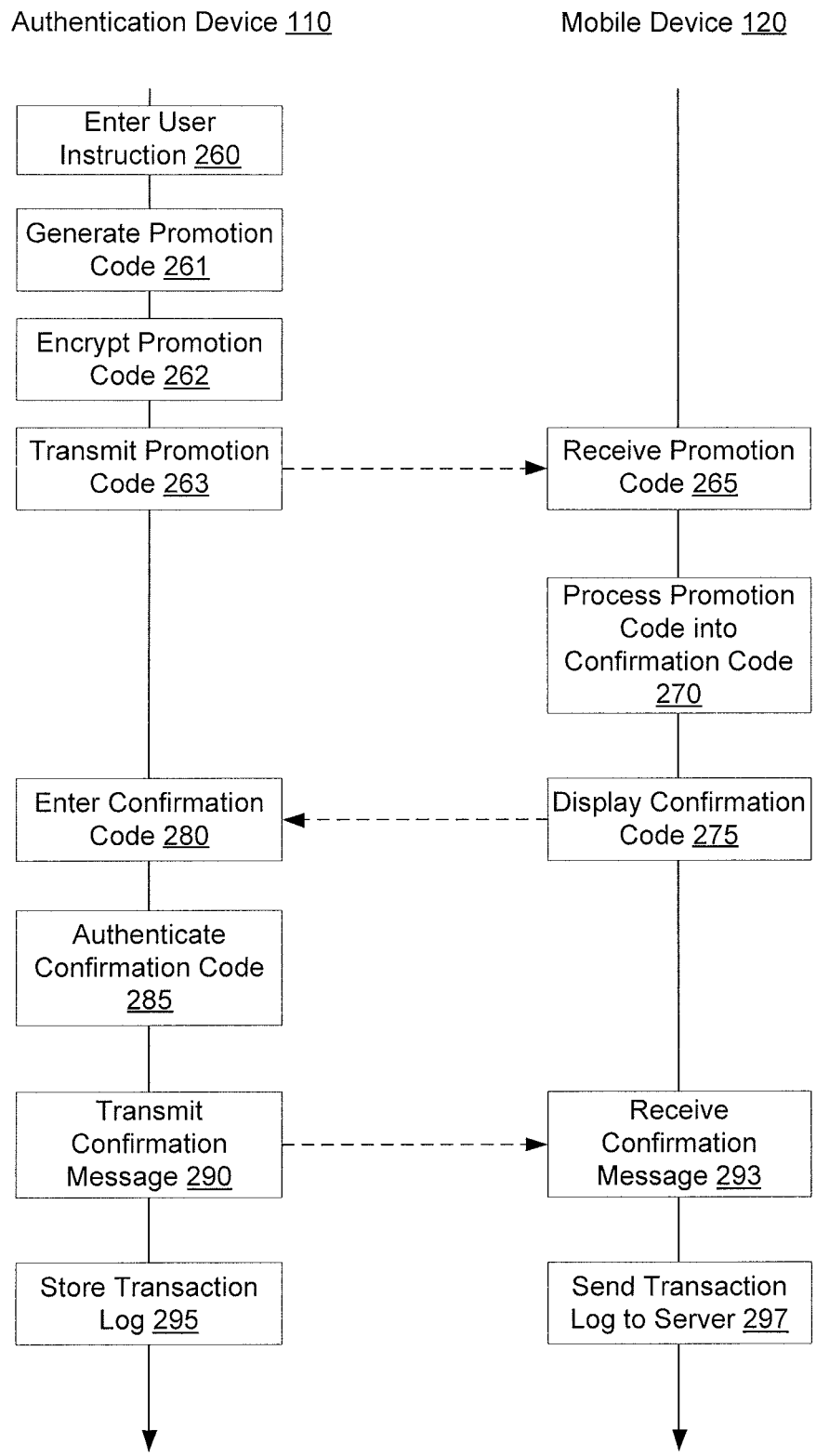
FIG. 2B depicts another two flow charts illustrating how the authentication device and the mobile device interact with each other to redeem an electronic promotion code in accordance with some implementations.

FIG. 2B depicts another two flow charts illustrating how the authentication device 110 and the mobile device 120 interact with each other to redeem an electronic promotion code in accordance with some implementations. Unlike the process shown in FIG. 2A, the process shown in FIG. 2B starts with a store clerk entering (260) one or more instructions into the authentication device 110. This may happen when a customer visiting the store wants to redeem an electronic coupon at the store. But the customer does not have the electronic coupon in his or her mobile device 120 initially. Instead, the authentication device 110 is configured to dynamically generate (261) an electronic promotion code in response to the user instructions entered by the store clerk. This process may further include the steps of encrypting (262) the promotion code and transmitting (263) the promotion code to the mobile device 120, which are similar to the steps 215 and 220 described above in connection with FIG. 2A, respectively.

The mobile device 120 (or more specifically, a mobile application on the mobile device) receives (265) the promotion code transmitted from the authentication device 110. In some implementations, the customer may activate the mobile application to detect the promotion code. In some other implementations, the mobile application is automatically activated upon receipt of the promotion code. Next, the mobile application processes (270) the promotion code into a confirmation code and displays (275) the confirmation code on the display of the mobile device 120. In some implementations, the mobile application re-applies the same procedure used by the authentication device 110 for encrypting the promotion code at step 261 to the promotion code and converts it into the confirmation code. In some other implementations, the mobile application applies another procedure, which is an inverse of the procedure used for encrypting the promotion code at step 261.

The customer then provides the confirmation code to the store clerk, who then enters (280) the confirmation code into the authentication device 110 through an input device. The authentication device 110 then authenticates (285) the confirmation code and determines whether it corresponds to an actual promotion code generated by the authentication device 110. In some implementations, the authentication device 110 applies a predefined procedure to the confirmation code, which should convert the confirmation code to the original promotion code or a predefined sequence (if the confirmation code has been processed by the mobile device 120 correctly).

In some implementations, after the authentication step 285, the authentication device 110 transmits (290) a confirmation message back to the mobile device 110, indicating that the customer has redeemed an electronic promotion code. Upon receipt of the confirmation message (293), the mobile application generates a transaction log record for the redemption and sends (297) the transaction log record to a remote server for further processing. In some implementations, the authentication device 110 may also generate a log record and store the log record in a storage device attached to the authentication device 110.

Figure 3:
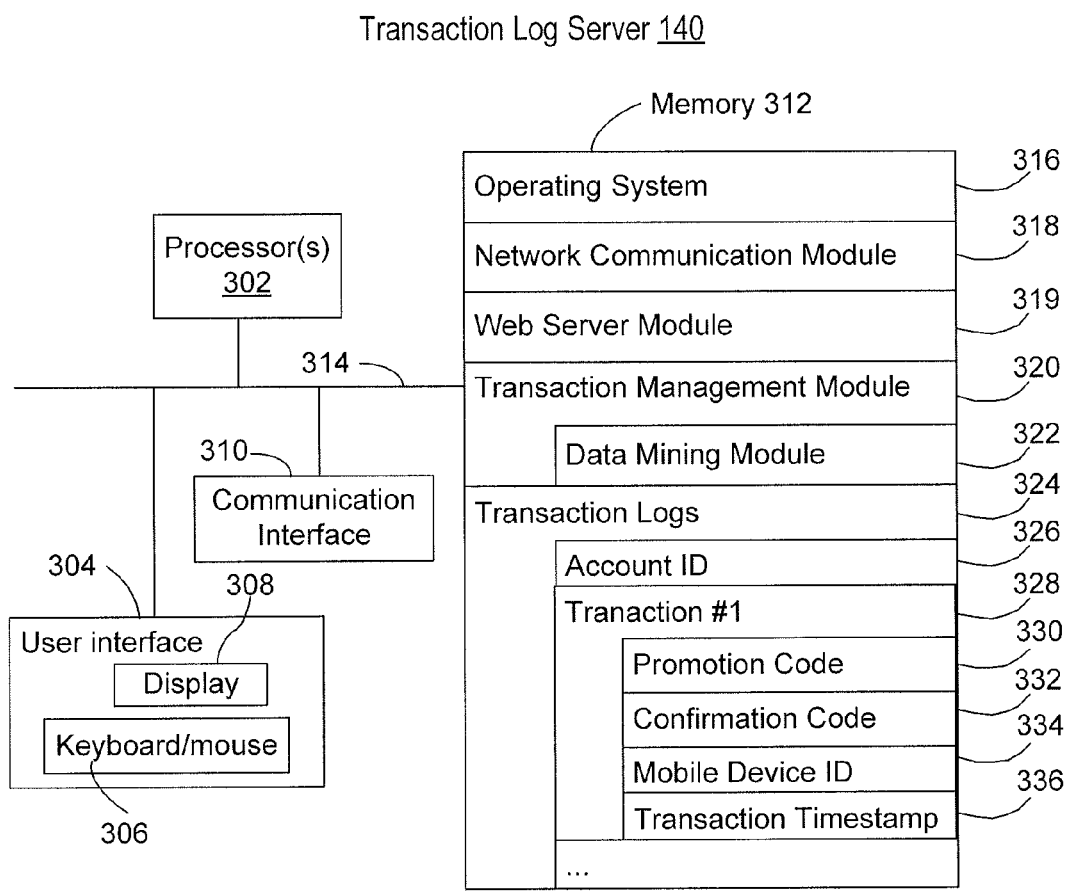
FIG. 3 is a block diagram illustrating the components of the transaction log server configured for managing transactions in accordance with some implementations.

FIG. 3 is a block diagram illustrating the components of the transaction log server 140 configured for managing transactions in accordance with some implementations. The Transaction log server 140 includes one or more processors 302 for executing modules, programs and/or instructions stored in memory 312 and thereby performing predefined operations; one or more network or other communications interfaces 310; memory 312; and one or more communication buses 314 for interconnecting these components. In some implementations, the transaction log server 140 includes a user interface 304 comprising a display device 308 and one or more input devices 306 (e.g., keyboard or mouse).

In some implementations, the memory 312 includes high-speed random access memory, such as DRAM, SRAM, DDR RAM or other random access solid state memory devices. In some implementations, memory 312 includes non-volatile memory, such as one or more magnetic disk storage devices, optical disk storage devices, flash memory devices, or other non-volatile solid state storage devices. In some implementations, memory 312 includes one or more storage devices remotely located from the processor(s) 302. Memory 312, or alternately one or more storage devices (e.g., one or more nonvolatile storage devices) within memory 312, includes a non-transitory computer readable storage medium. In some implementations, memory 312 or the computer readable storage medium of memory 312 stores the following programs, modules and data structures, or a subset thereof:

- an operating system 316 that includes procedures for handling various basic system services and for performing hardware dependent tasks;
- a network communications module 318 that is used for connecting the transaction log server 140 to other computers (e.g., the database 150) via the communication network interfaces 210 and one or more communication networks (wired or wireless), such as the Internet, other wide area networks, local area networks, metropolitan area networks, etc.;
- a web server module 319 for handling requests from clients to access the transaction log records and results of mining the transaction log records;
- a transaction management module 320 for managing the transaction log records collected from different mobile devices or authentication devices, further including a data mining module 322 for performing different operations (e.g., grouping, statistical analysis, and data visualization, etc.) to the transaction log records; and
- a plurality of transaction logs 324, each log including an account ID 326 identifying a particular point of sale, a plurality of transaction records 328, each record including a promotion code 330, a confirmation code 332, a mobile device ID 334, and a transaction timestamp 336, etc.

Figure 4:
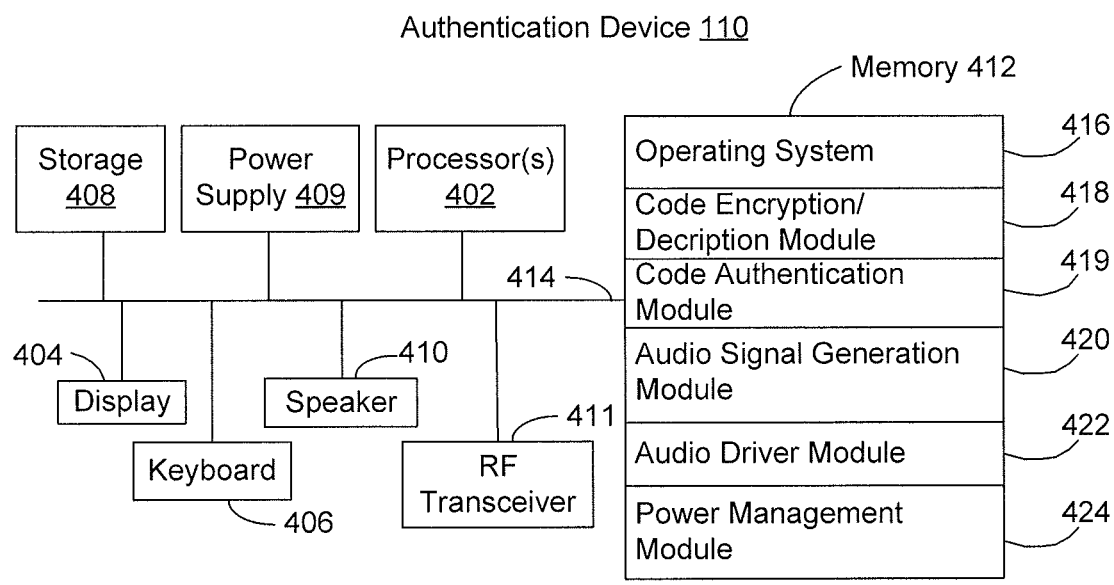
FIG. 4 is a block diagram illustrating the components of the authentication device configured for performing operations for redeeming promotion codes in accordance with some implementations.

FIG. 4 is a block diagram illustrating the components of the authentication device 110 configured for performing operations for redeeming promotion codes in accordance with some implementations. The authentication device 110 includes one or more processors 402 (e.g., micro-controller units) for executing modules, programs and/or instructions stored in memory 412 and thereby performing predefined operations; a radio-frequency transceiver 411; memory 412; and one or more communication buses 414 for interconnecting these components. In some implementations, the authentication device 110 includes a display device 404, a keyboard 406, a speaker 410, a storage device 408, and a power supply 409.

In some implementations, the memory 412 includes high-speed random access memory, such as DRAM, SRAM, DDR RAM or other random access solid state memory devices. In some implementations, memory 412 includes non-volatile memory, such as one or more magnetic disk storage devices, optical disk storage devices, flash memory devices, or other non-volatile solid state storage devices. In some implementations, memory 412 includes one or more storage devices remotely located from the processor(s) 402. Memory 412, or alternately one or more storage devices (e.g., one or more nonvolatile storage devices) within memory 412, includes a non-transitory computer readable storage medium. In some implementations, memory 412 or the computer readable storage medium of memory 412 stores the following programs, modules and data structures, or a subset thereof:

- an operating system 416 that includes procedures for handling various basic system services and for performing hardware dependent tasks;
- a code encryption/decryption module 418 for encrypting/decrypting a promotion code;
- a code authentication module 419 for authenticating a confirmation code;
- an audio signal generation module 420 for converting a promotion code into a high-frequency audio signal;
- an audio driver module 422 for driving the speaker 410 to broadcast the high-frequency audio signal corresponding to the promotion code; and
- a power management module 424 for providing the power supply 409 to the authentication device 110.

Figure 5:
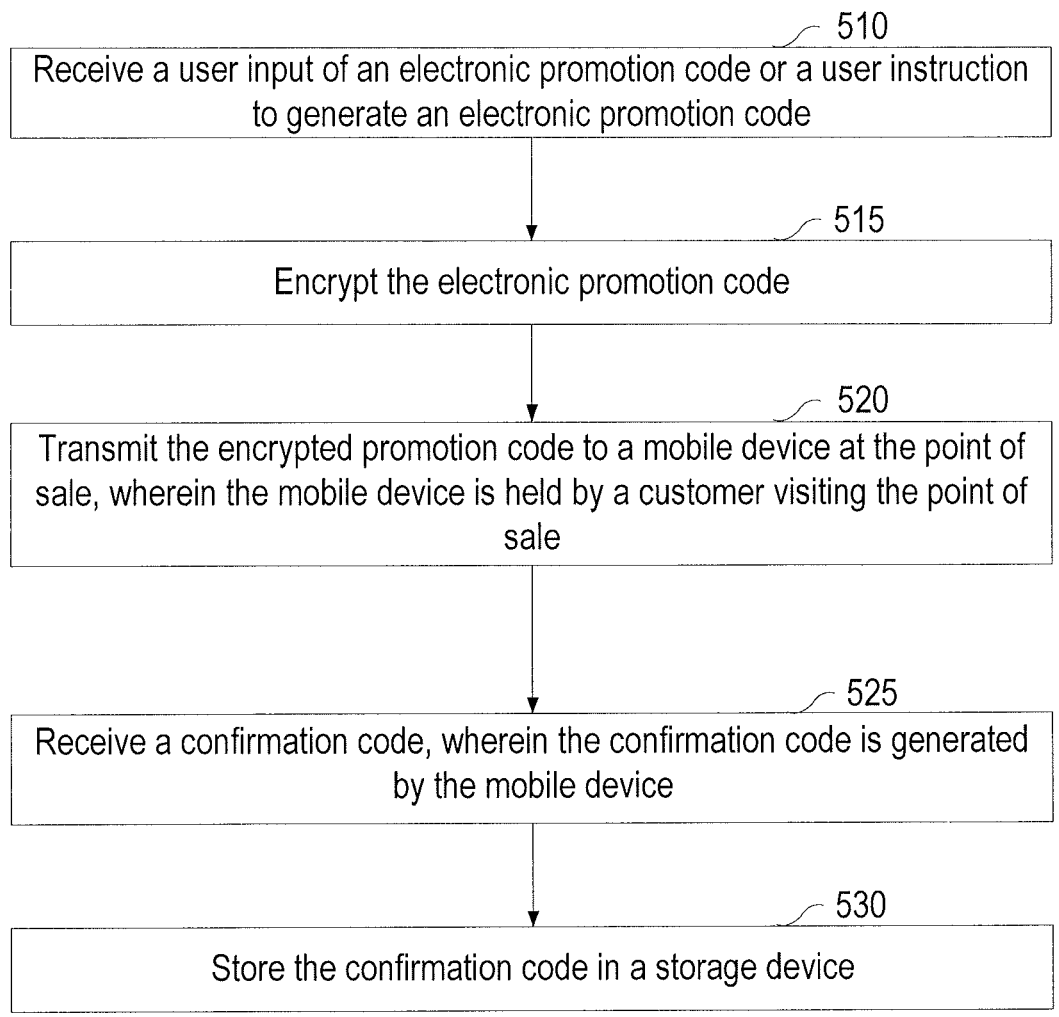
FIG. 5 is a flow chart illustrating how the authentication device redeems an electronic promotion code in accordance with some implementations.

FIG. 5 is a flow chart illustrating how the authentication device 110 redeems an electronic promotion code in accordance with some implementations. First, the authentication device 110 receives (510) a user input of an electronic promotion code. For example, the user may be a clerk working at a point of sale. In some implementations (as shown in FIG. 2B), the user authentication device 110 receives a user instruction to dynamically generate a new electronic promotion code. The authentication device 110 then encrypts (515) the promotion code into a high-frequency audio signal using, e.g., the MFSK technology. Next, the authentication device 110 transmits (520) the audio signal including the encrypted promotion code to a mobile device at the point of sale. In some implementations, the mobile device is held by a customer visiting the point of sale. The customer generates the promotion code by invoking a mobile application running on the mobile device and then provides the promotion code to the clerk for entering the code into the authentication device.

Upon receipt of the audio signal including the encrypted promotion code, the mobile application decrypts the promotion code within the audio signal using, e.g., the Goertzel algorithm and compares it with one or more predefined conditions to determine if this is an authentic promotion code. After determining the authenticity of the promotion code, the mobile application generates a confirmation code and includes it in a message to be displayed on the display of the mobile device. The clerk then enters the confirmation number into the authentication device. After receiving (525) the confirmation device, the authentication device then generates a corresponding transaction log record and stores (530) the record including the confirmation code in a storage device accessible to the authentication device.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Finally, the foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for redeeming an electronic promotion code at a point of sale, the method comprising:
   at an authentication device having a keyboard, a storage device, memory and one or more processors, wherein the authentication device is only capable of communicating with devices adjacent the point of sale via short-range audio or radio signals:
      receiving a user input of an electronic promotion code through the keyboard;
      encrypting the electronic promotion code;
      transmitting the encrypted promotion code to a mobile device at the point of sale via the short-range audio or radio signals, wherein the mobile device is held by a customer visiting the point of sale;
      receiving a confirmation code from the mobile device via the short-range audio or radio signals, wherein the confirmation code is generated by the mobile device and the mobile device is also configured to generate a first transaction log record including the electronic promotion code, the confirmation code, and a unique identifier of the mobile device and send the first transaction log record to a remote server;
      storing the confirmation code in the storage device; and
      generating a second transaction log record including the electronic promotion code and the confirmation code and storing the second transaction log record in the storage device, wherein the second transaction log record is subsequently copied into another storage device that is detachably connected to the authentication device and the copied second transaction log record is then loaded into the remote server and compared with the first transaction log record in connection with a verification operation of the transaction between the authentication device and the mobile device at the remote server.

2. The method of claim 1, wherein the electronic promotion code is entered by an authorized person working at the point of sale.

3. The method of claim 1, wherein the electronic promotion code is kept confidential from the customer visiting the point of sale.

4. The method of claim 1, wherein the authentication device includes a speaker and transmitting the encrypted promotion code to the mobile device further includes:
   converting the encrypted promotion code into a high-frequency audio signal; and
   broadcasting the high-frequency audio signal to the mobile device via the speaker of the authentication device, wherein the mobile device is configured to convert the high-frequency audio signal back to the encrypted promotion code.

5. The method of claim 1, wherein the authentication device includes a radio-frequency transceiver and transmitting the encrypted promotion code to the mobile device further includes:
   converting the encrypted promotion code into a radio-frequency signal; and
   broadcasting the radio-frequency signal to the mobile device via the radio-frequency transceiver, wherein the mobile device is configured to convert the radio-frequency signal back to the encrypted promotion code.

6. The method of claim 1, wherein the mobile device is one selected from the group consisting of a mobile phone, a tablet computer, a laptop computer, and a netbook computer.

7. The method of claim 1, wherein the mobile device is configured to generate the confirmation code after authenticating the encrypted promotion code.

8. A method performed by an authentication device and a mobile device for redeeming an electronic promotion code at a point of sale, wherein the authentication device is only capable of communicating with the mobile device via short-range audio or radio signals, the method comprising:
   at the authentication device having a keyboard, a storage device, memory and one or more processors:
      receiving a user input of an electronic promotion code through the keyboard;
      encrypting the electronic promotion code; and
      transmitting the encrypted promotion code to the mobile device via the short-range audio or radio signals;
   at the mobile device having a cellular wireless communication module, memory and one or more processors:
      receiving the encrypted promotion code via the short-range audio or radio signals;
      decrypting the encrypted promotion code; and
      after determining that the decrypted promotion code satisfies one or more predefined conditions,
         displaying a message on the mobile device, indicating a successful redemption of the promotion code and generating a first transaction log record including the electronic promotion code and a unique identifier of the mobile device and sending the first transaction log record to a remote server through the cellular wireless communication module;
   at the mobile device:
      after determining that the decrypted promotion code satisfies one or more predefined conditions, generating a confirmation code and displaying the confirmation code on a display of the mobile device; and
   at the authentication device:
      receiving a user input of the confirmation code through the keyboard;
      generating a second transaction log record including the confirmation code and a timestamp; and
      storing the second transaction log record in a storage device coupled to the authentication device, wherein the second transaction log record is subsequently copied into another storage device that is detachably connected to the authentication device and the copied second transaction log record is then loaded into the remote server and compared with the first transaction log record in connection with a verification operation of the transaction between the authentication device and the mobile device at the remote server.

9. The method of claim 8, further comprising:
   at the mobile device:
      after determining that the decrypted promotion code satisfies one or more predefined conditions, generating a confirmation code and including the confirmation code in the transaction log record before transmitting the transaction log record to the remote server.

10. The method of claim 8, further comprising:
at the mobile device:
- after determining that the decrypted promotion code satisfies one or more predefined conditions, generating a confirmation code and transmitting the confirmation code back to the authentication device via the short-range audio or radio signals; and at the authentication device:
- receiving a confirmation code from the mobile device;
- generating a second transaction log record including the confirmation code and a timestamp; and
- storing the second transaction log record in a storage device coupled to the authentication device, wherein the second transaction log record is subsequently compared with the first transaction log record in connection with a verification of the transaction between the authentication device and the mobile device.

\* \* \* \* \*